July 9, 1935.  A. SAMBRAUS  2,007,308

METHOD OF SOLDERING

Filed Oct. 27, 1932

Inventor:
Adolf Sambraus
By [signature]
Attorney.

Patented July 9, 1935

2,007,308

UNITED STATES PATENT OFFICE 2,007,308

METHOD OF SOLDERING

Adolf Sambraus, Berlin-Charlottenburg, Germany

Application October 27, 1932, Serial No. 639,908
In Germany February 25, 1931

2 Claims. (Cl. 113—112)

The present application in the appended claims is limited to a method of soldering of general application, of which one instance where such soldering may be employed is described as in airplane construction. In applicant's copending application, Serial No. 743,126, filed September 7, 1934, which is a continuation in part of this application, the construction of an airplane has been specifically described and claimed by solder methods.

In the construction of all metal aircraft bodies and structural parts, it is customary to employ tubes, rolled profiles and thin plates of light metal with connections by means of pins and screws.

The invention relates to methods of soldering, particularly to air-ships, and consists in the stress-transmitting members, which are of solderable and sufficiently strong metal, for example steel, being connected to each other by joints of hard or preferably soft soldering. Thereby the surprising result is achieved of a considerable reduction in weight, because it is possible to work in unusually small thickness of metal and no other difficulties occur. In the case of pin or screw connections, it is always necessary to make the jointed parts of thicker metal than is necessary to resist stress, in view of the friction pressure at the pin or screw holes. With soldering, this drawback is removed and strength equal to riveting for equal joint areas is obtained, because instead of the sum of the several cross sections of the pins, the effective joint strength is that of the cross section of the solder metal which covers the whole joint surface and is therefore much larger. Furthermore, repair work is simplified, because soldering is easier to perform than riveting, especially in the case of closed profiles and hollow members with an inaccessible interior; also running repairs can be carried out by means of ordinary tinman's work instead of steel-work which requires skilled labor.

The use of soldering materials of low soldering temperature, or soft solders, is advantageous, but soldering materials melting at a somewhat higher temperature may be used where further soldering has to be carried out in adjacent positions without loosening the former soldering. Also, damage to the thin plates or profiles by heat is prevented and no noticeable buckling of high grade alloy steels can occur.

The invention consists in a special arrangement of the soldered joints in such a way that the main stress on the soldering metal is a shear or pull stress (i. e. the same kind of stress as that which rivets are best adapted to sustain), rather than a tension stress, as in the case of screwbolts. The area of soldering is kept free of bending stress, if necessary by providing flexible joint parts on stiff members. Thereby the relatively high shearing strength of the soldering metals is utilized. The solder joint in most cases is sufficiently resistant against any small local tensional stresses, and if necessary relatively small additional stiffenings may be applied.

For the covering of the supporting wings or hulls, the covering plates are soldered by means of overlap joints. Thereby in the case of the usual construction of supporting wings with internal cross beams, the whole cross section of the solder is effective to resist the shear produced by torsion.

The internal connections consist of beam-like members, preferably sheet metal girders, connected to each other and when necessary to the outer skin, by means of head stays or gussets and flanges, the joints being soldered. The construction may be similar in general design to riveted construction because the solder joints are easily able to transmit the same stress as rivets.

A particularly valuable feature consists in that the sheet metal girders, at their flanges or webs mostly exposed to buckling may have additional flanges, for example angle profiles, soldered thereto in order to provide stiffening. This enables all the material of the supports to be made very thin and the additional stiffenings may be still thinner and of softer metal.

In an air-ship there may be used with particular advantage the closing of half hollow and hat-shaped profiles with cover plates or outer skin plates in order to form completely closed girders. In this case also, inwardly curved flanges can be used which could not be riveted; thereby space may be saved and smoother walls built. To replace rivets by soldering is of special advantage in all cases of outer skin constructions, because considerably smoother outer surfaces are formed which offer less air resistance.

When, in order to transmit considerable stresses, soldering of large surfaces is effected, or of spots or strips of members of large area contacting with each other, it is preferable to tin the parts to be soldered or to provide them with holes for the supply of the solder. In every case a reliable soldering exactly at the desired areas is attained.

The drawing illustrates several structural parts of an air-ship according to the invention, and several modifications, but are to be considered as explanatory only and by way of example.

Figure 1:
Figs. 1 and 2 are plan and side views of a soldered joint which is as far as possible free from bending stress.
Figure 2:
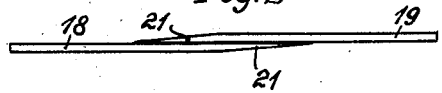

According to Figs. 1 and 2, two plates 18, 19 having a soldering lap joint are shaped to give flexibility and prevent bending stresses at the solder joint in a direction at right angles or nearly at right angles to the plane of the joint. This is accomplished in two ways: the ends are provided with deep serrations 20, and are tapered towards the edge as shown at 21. Either or both of these ways may be employed.

Figure 3:
Fig. 3 shows diagrammatically several kinds of lap joints.

Fig. 3 shows various kinds of lap joints, such as simple lap joints with one cover plate and with two cover plates; all these are formed, for example, as shown in Figs. 1 and 2.

Figure 4:
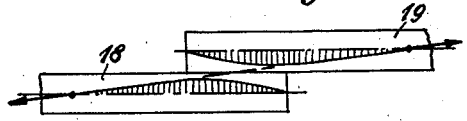
Fig. 4 is a stress diagram.

Fig. 4 shows in a diagrammatic way two lap-jointed plates, and the bending-moment areas. These bending-moments in the case of thick plates would result in substantial normal stresses in addition to shearing stresses and these normal stresses usually are the cause of fracture of the soldered joint. The constructions according to Figs. 1 and 2 eliminate such normal stresses and their dangers and stiff members should be made flexible at the joint places in the mentioned manner.

In jointing the thinnest plates in the assembly of an air-ship according to the present invention, a further important advantage is realized since these plates before being worked may be stiffened with a backing of cardboard or stiff paper and then assembled, the paper backing, of course, being omitted along the edges to be soldered; the backing may subsequently be removed, for example, by simple loosening or by means of a solvent. This prevents buckling of the thinnest plates.

For plates to be applied with pre-tension advantageously during the soldering of the rims, a heated roll or slide in front of the soldering iron may be moved over the plate in such a way that it is soldered while warm and stretches during the following cooling.

For preparing the metallic parts to be soldered, during the assembly of the air-ship it is desirable to remove the rolling film by means of a buffing wheel or a sand blast before soldering takes place; in particular, pre-treatment by means of a buffing wheel in addition to removing the rolling scale, provides a desirable surface roughening which improves the adherence of the solder.

I claim as my invention:

1. A method of forming a stress resisting joint between structural members for aircraft and the like, comprising rendering said members flexible by forming serrations therein at the parts to be jointed, and lap jointing said flexible parts by soldering with soft solder over substantially the entire joint area.

2. A method of forming a stress resisting joint between structural members for aircraft and the like, comprising rendering said members flexible by tapering them at the parts to be jointed and lap jointing said flexible parts by soldering with soft solder over substantially the entire joint area.

ADOLF SAMBRAUS.